Sept. 1, 1959    G. L. HOBROUGH    2,901,909
ALTITUDE SENSING DEVICE
Filed June 14, 1957    2 Sheets-Sheet 1

*Inventor*
GILBERT L HOBROUGH by: J. Richard Cavanagh
*Patent Agent*

Sept. 1, 1959        G. L. HOBROUGH        2,901,909
ALTITUDE SENSING DEVICE

Filed June 14, 1957        2 Sheets-Sheet 2

Inventor
GILBERT L. HOBROUGH by: *J. Richard Cavanagh*

Patent Agent 2,901,909
Patented Sept. 1, 1959

2,901,909

ALTITUDE SENSING DEVICE

Gilbert Louis Hobrough, Oshawa, Ontario, Canada, assignor to The Photographic Survey Corporation Limited, Toronto, Ontario, Canada Application June 14, 1957, Serial No. 665,787

10 Claims. (Cl. 73—384)

This invention relates to an altitude sensing device adapted for use in aircraft utilized for aerial survey work and the like for providing a precise measurement of the aircraft above sea level.

Pressure measuring apparatus utilizing an hypsometer principle in which a boiling liquid contained in a vessel has had the temperature thereof measured by a temperature sensing device has been utilized heretofore for indicating the maximum altitude achieved by missiles, rockets and the like. The art of hypsometry as applied to the determination of altitude is represented for example by United States Patents 2,677,279; 2,713,795 and 2,599,276. In spite of a number of previous investigations in the field of hypsometry instrumentation for indicating a maximum altitude achieved by a missile, or for giving a continuous recording of altitude as a missile ascends from sea level to maximum altitude, there has been no prior suggestion of utilizing the hypsometer principle for the continuous indication of altitude in ordinary aircraft or in aircraft utilized for survey purposes. Prior art structures generally are not suitable for such use due to the dissipation of the boiling liquid on the one hand, or due to the extension of refrigerating means for condensation of vapour. Thus, in one prior art apparatus Dry Ice is utilized as a coolant to maintain condensation of vapours from the boiling liquid.

It is well known that conventional aircraft altimeter instrumentation is subject to error of the order of 50 feet in 1000, that is, about 5%. Refined instrumentation may reduce the error to ½ this amount. Under conditions of flying at high altitude it must be apparent that one aircraft assigned to a 20,000 foot flight level could, due to instrument error, intercept another aircraft flying at an 18,000 foot level while the instruments of both aircraft were reading to the assigned levels. There is, therefore, a great need for an altimeter device of precision substantially better than 1%. For aerial survey purposes an accuracy considerably better than $\frac{1}{10}$ of 1% is desirable to provide a base reference against which clearance height measurements may be compared to obtain ground profile elevations.

According to the invention an hypsometer principle is utilized as an accurate means of measuring pressure for the continuous determination of altitude for application to altimeter instrumentation of conventional aircraft.

It is an object of the invention to provide an hypsometer structure adapted for continuous use and having a total error of less than ten feet at all altitudes. For survey purposes refined instrumentation may be provided having a total error less than one foot at all altitudes.

It is another object of the invention to provide an improved hypsometer construction embodying as novel components therein a refluxing region and a vapour reservoir to thereby render the same adaptable for continued use.

Other objects of the invention will be appreciated by a study of the following specification taken in conjunction with the accompanying drawings.

Figure 1:
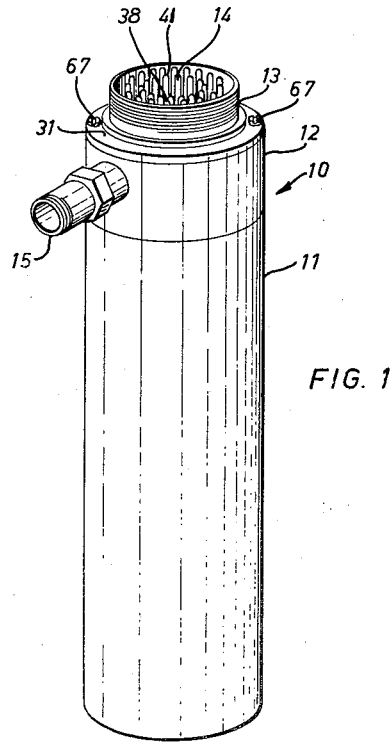
Figure 1 is a perspective view of an hypsometer altitude sensing device according to the invention.

As shown in Figure 1 the sensing device of the invention is generally indicated by the numeral 10 in Figure 1, and comprises an outer casing 11 having an upper head part 12 carrying an electrical communicating fitting 13 with terminals 14 therein of conventional construction adapted for engagement by an electrical connector (not shown) of well-known form; a pressure fitting 15 connects to the head part 12 of the casing 11 for communication of ambient pressure thereto.

Figure 4:
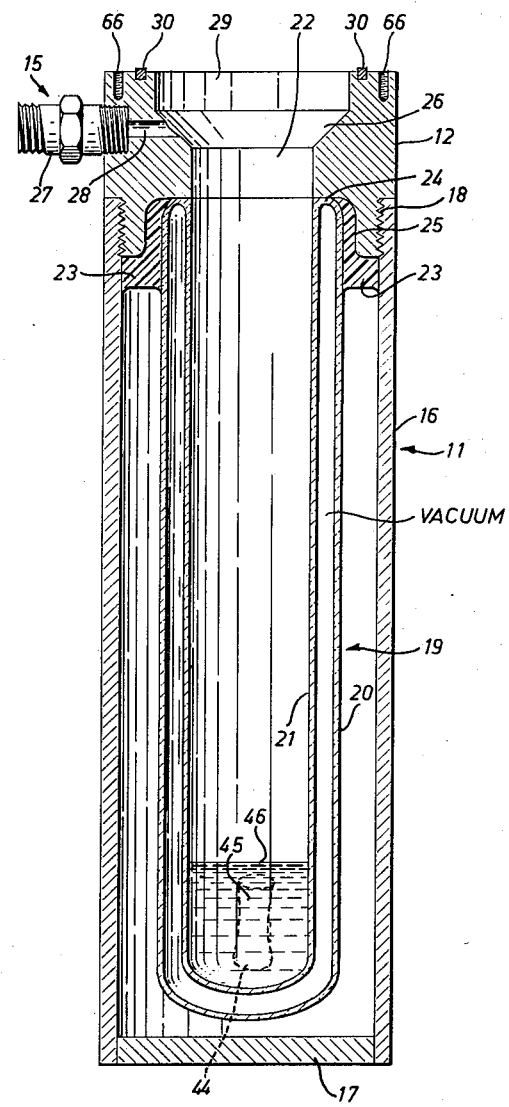
Figure 4 is a sectional view of the hypsometer casing structure of the invention adapted for reception of the sensing head of Figure 3.
Figure 3:
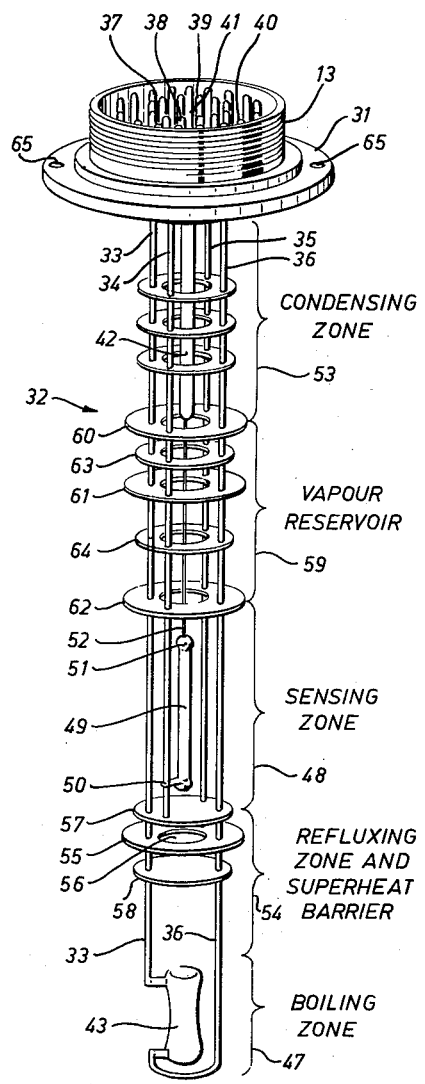
Figure 3 is a perspective view of the sensing head structure of the hypsometer of the invention.

As shown in more detail in Figures 3 and 4 the casing may be formed of an aluminum tube 16 having a lower end closed by wall 17 and the upper end thereof in threaded engagement as at 18 with the head part 12 to suspend therewithin the silvered glass flask 19 having an outer wall 20 and integral inner wall 21 separated from the outer wall by a vacuum and recognizable as a conventional vacuum flask. The inner surface of the inner wall 21 is of a diameter conforming with the diameter of the inner bore 22 of the head part 12 and may be supported in alignment therewith within the casing 11 by an epoxy resin cement 23 extending between the upper portion 24 of the flask 19 and the socket-like bore 25 of head part and tube 16.

The upper portion of the head part 12 embodies a diverging opening 26 communicating to the ambient pressure fitting 27 by bore 28 and communicating likewise with the enlarged bore or open end 29 adapted to be closed when the sealing ring 30 thereof is fully engaged by the flanged base or cap 31 of the electrical connecting fitting 13 shown in Figure 3.

A sensing head insert assembly 32 is shown in Figure 3 and embodies depending supporting rods 33, 34, 35 and 36, adapted to serve as electrical conductors and connected to terminals 37, 38, 39 and 40 respectively of the electrical male socket head or fitting 13. A central terminal 41 suspends an axially depending electrical conductor 42 hereinafter referred to as a supplementary condenser. It may be observed that the rod 35 need not serve as an electrical lead but may be employed merely for structural purposes.

The rods 33 and 36 extend downwardly to make electrical connection to and to physically support a heating element at the lowermost extremity of the structure 32. The heating element 43 preferably comprises a conventional ceramic-coated wire wound resistance, for example of about 25 ohms and about 10 watts rating. The length of the rods 33 and 36 is such that the heating element 43 is adapted to be suspended within the flask 19 in the position indicated by chain lines 44 in Figure 4 and to be immersed therein within a liquid indicated by numeral 45 substantially sufficient only to cover the heating element such as at the level 46. The preferred liquid used in the boiling zone 47 identified in Figure 3 is toluene, being a pure chemical compound of neutral non-aqueous, non-electrolytic characteristics, which is stable against decomposition or oxidation in air, and which at normal pressure has a boiling point of about 115° C. According to the invention a boiling liquid having a boiling point higher than water is utilized to exclude water accumulation and therefore humidity effects. In addition, the heater 43 is operated at a temperature ensuring the continuous boiling of the boiling liquid.

A temperature sensing zone 48 is indicated on the structure of Figure 3 and embodies a conventional thermistor 49 having a negative resistance temperature coefficient being preferably of rod-like form disposed axially within the rods 33 to 36 and rigidly connected at its lower end by the rigid communicating tab 50 to the rigid electrical communicating support rod 34. The upper end 51 of the sensing element or thermistor 49 connects by relatively thin electrical lead 52 axially to the relatively large volume copper supplementary condenser rod 42 disposed at the upper end of the structure 32 in the condensing zone 53. According to this invention a refluxing zone and superheated barrier 54 is provided between the heater 43 and sensing element 49 by means of the aperture disc 55 extending to substantially the full diameter of the inner wall 21 of flask 19 and having a central aperture 56 through which vapours must pass. The aperture disc 55 is supported on the rods 33 and 36 extending therethrough the discs 57 and 58 axially spaced above and below disc 55 being similarly supported but of a diameter less than the diameter of the inner surface of the inner wall 21 of flask 19 but greater than the diameter of the aperture 56. By this means vapours rising from the boiling zone 47 are subjected to partial condensation and substantial refluxing of condensate to the boiling zone. In addition to the refluxing action and cooling of superheated vapours the disc 58 serves a secondary function by deflecting and capturing superheated droplets of the liquid which may be entrained in the rising vapour stream. By this means the vapours arriving in the sensing zone 48 are controlled to a precise boiling temperature corresponding to the ambient pressure.

Further, in accordance with the invention a vapour reservoir 59 is provided immediately above the sensing zone and is defined by a plurality of apertured discs of substantially the full diameter of the inner diameter of the wall 21 of flask 19 designated by numerals 60, 61 and 62, the said apertured discs being axially spaced about i.e. separated by lesser diameter apertured discs 63 and 64.

In operation ambient air pressure is in communication with condensing zone 53 and condenser rod 42 effects condensation of such vapours as may rise thereto. There is no clear dividing line between the condensing zone and the vapour reservoir and such division as exists may continually shift slightly upwardly or downwardly according to ambient pressure changes. In this connection the vapour reservoir introduces a novel function in that there is provided an effective containment of vapours at substantially boiling temperature above the sensing zone and which serves to separate the latter from the condensing zone. According to the invention the communicating lead 52 is preferably of substantially filament size whereby condensate proceeding to the sensing element 49 must pass through the vapour reservoir and be heated to boiling point before reaching the sensing element.

The vapour reservoir is provided to enable continued operation of the instrument during relatively rapid descent of the aircraft. Decreasing altitude is accompanied essentially by increasing boiling point. Vapour automatically condenses on all surfaces under these conditions, the latent heat of vaporization being liberated and the surfaces being raised in temperature. During a rapid descent the loss of vapour by this process may exceed the rate of vapour production in the boiler, so that the volume of vapour in the system may be temporarily reduced. The vapour reservoir being placed between the sensing element and the condenser permits of appreciable vapour volume reduction without permitting the vapour line to drop below the level of the sensing element, with consequent error in pressure reading.

The sensing device shown in dis-assembled relationship in Figures 3 and 4 is assembled as a complete unit, as shown in Figure 1, by fastening mounting screws through holes 65 of flange 31 of fitting 13 threadedly engaging in the threaded holes 66 of the head part 12 and indicated by numeral 67 in Figure 1. The terminals 38 and 41 leading from the sensing element 49 are connected in any suitable utilizing circuit for indicating boiling temperature or elevation above sea level as a function of temperature as may be desired.

Figure 2:
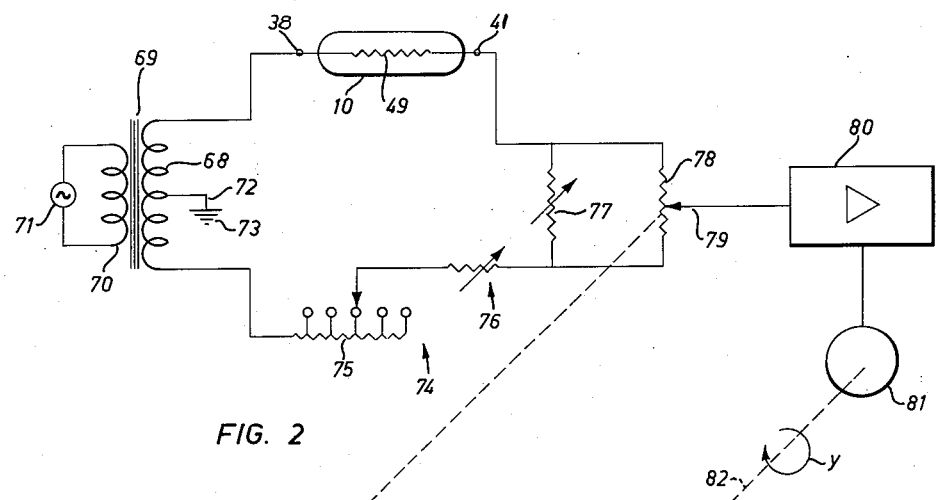
Figure 2 is an electrical schematic of one kind of altitude indicating means adapted to be energized by the altitude sensing device of the invention.

One kind of indicating system of general utility for indicating elevation for aerial survey purposes is illustrated in Figure 2 wherein the sensing device is shown having its sensing element 49 and terminals 38 and 41 connected in an electrical bridge arrangement containing a centre tapped secondary winding 68 of energizing transformer 69 having primary winding 70 energized by suitable source 71 in which the centre tap 72 of the secondary winding is grounded as at 73. The sensing element 49 constitutes one arm of the bridge circuit arrangement opposed to another arm 74, comprising the adjustable stepped resistance 75 adapted for coarse adjustment of elevation levels such as at 1000 foot steps and a fine adjustment potentiometer 76. A sensitivity adjustment on the bridge circuit arrangement is accomplished by the variable resistor 77 extending between the two arms and effectively closing the bridge circuitry. The bridge output is obtained from the load resistance 78 in the form of a potentiometer having an armature 79 whereby at a given altitude setting, according to the adjustment of the step resistance 75 and fine adjustment 76, a null or zero signal may be obtained.

By way of example, a signal is shown as being communicated from the armature 79 to a conventional servo amplifier 80 driving a conventional servo motor 81 having an output shaft indicated by chain lines 82 and adapted to be rotated in the direction of arrow Y to actuate a suitable indicator (not shown) to indicate altitude, that is, height above sea level. The continuation of chain line 82 to armature 79 indicates a closed functional loop in which armature 79 is adjusted from the null point responsive to the elevation indicated whereby the system continuously seeks the null balance point on the bridge responsive to a shift in bridge output determined by a change in the resistance of the sensing element 49 caused by a change in liquid boiling point due to change in ambient pressure, the latter being a function of elevation above sea level.

The sensing device of the invention is particularly adapted for the continuous measurement of altitude in aerial survey work and may be operated for long periods of time without loss of boiling liquid or other effect on the functioning of the apparatus. In addition, the very fine limits of accuracy achieved in altitude measurements with devices of the invention, for example, within one tenth of a foot per one thousand feet, have enabled the use of the device as a dependable reference for aerial survey purposes in which reference level is of great importance for establishing a true clearance height of the aircraft above the ground.

The specific form of hypsometer disclosed herein and used for aerial survey purposes embodies a specific geometry which would be modified if the device is to be adapted for altimeter instrumentation in commercial aircraft. Thus in Figure 3 an enlargement of the diagram such that the total height of all of the zones would measure 9¼ inches would represent suitable dimensions of structure in which each of the baffles would be formed of a plastic material of relatively low heat conductivity and high corrosion resistance such as Teflon. The large diameter baffles would be 15⁵⁄₁₆ inches in diameter, and would carry a ⅝ inch diameter opening therein. The smaller diameter baffles would be of 1 inch in diameter, certain of which would have an aperture of ¼ inch diameter or otherwise of a sufficient diameter to avoid bridging of a liquid droplet from the baffle to the conductor 52.

In a general sense the boiling liquid utilized should be a hydrocarbon compound having a higher boiling point than water, such as xylene or toluene. Benzene has a lower boiling point than water and is therefore not suitable because humidity effects will then affect the accuracy.

In operation the head 12 serves as the main condenser particularly by reason of the cooling effect of the surfaces of the throat area thereof, defined by bore 22. The head 12 is formed of a metal such as aluminum of high thermal conductivity in physical connection with the housing or casing 16 presenting a large radiating surface area. The rod 42 serves as a supplementary condenser without which the device while operative would be impractical for purposes intended. The rod 42 is formed in the present example of tinned 12 gauge copper of substantially 2¼ inches in length. The conductor 52 electrically connecting the rod 42 and sensing element 51 is of small diameter and of relatively low thermal conductivity being formed preferably of stainless steel and effectively thermally isolating the sensing element 49 from the inner or supplementary condenser 42. The condenste runs from the throat surfaces of bore 22 down the inner surfaces 21 of vessel 19. The mass and surface area of the head 12 and casing 16 must be sufficient to dissipate all the heat input of the heater 43 at the highest altitude and at such altitude must be at a temperature less than the boiling point of the boiling liquid.

A rapid decrease in elevation will require a large heat input to maintain continuous boiling as the boiling point increases. A small thermistor will provide a short thermal time constant and will therefore follow rapid temperature changes, that is rapid changes in elevation. In such instance the height of the refluxing zone and super heat barrier may be reduced because the required precision, for example in commercial aircraft use, will be less than in aerial survey work. The wall of the evacuated vessel 19 and the parts of the sensing structure indicated in Figure 3 preferably should be as thin as possible to roduce the mass thereof to a minimum and thereby reduce the thermal inertia to a minimum. Skilled persons will appreciate that a minimum amount of liquid will be resired under such circumstances so that the vapour supply may be maintained under rapid descent conditions.

It will be apparent that the function of the vapour reservoir is twofold in that it not only effectively isolates the condensing zone and the sensing zone, but by virtue of the electrically connecting wire or filament 52 of negligible thermal conductivity permits the re-heating of condensate flowing therethrough down from the supplementary or auxiliary condenser 42 by rising vapours. Droplets of condensate flow down the wire 52 and bathe the thermistor to maintain it in wet condition and due to contact with rising vapours achieve a boiling point temperature before contacting the thermistor whereby an intimate two phase mixing of rising vapours at boiling temperature and the heating of condensate to boiling temperature is accomplished at the point of temperature sensing, namely in the sensing zone.

What I claim as my invention is:

1. An ambient pressure sensitive device for continuous use in aircraft altimeter instrumentation and the like and comprising in combination: an elongated vessel having an upper end and a lower end; said vessel having an opening adjacent the upper end thereof in communication with external ambient pressure; a boilable liquid in said vessel at the lower end thereof having a higher boiling point than water; a heating element for heating said liquid at a predetermined rate to ensure vigorous boiling thereof at the ambient pressure being measured and during a change in said pressure; a condensing head on said vessel at the upper end thereof including means for dissipating heat therefrom at a rate substantially corresponding to the rate of heat input of said heating element; a temperature sensing element in said vessel adjacent said heating element but disposed thereabove; and baffle structure defining within said vessel a condensing zone adjacent said head, a vapour reservoir thermally isolating said zone and said sensing element, a sensing zone about said temperature sensing element and a refluxing zone serving as a super heat barrier between said sensing zone and said heating element.

2. An ambient pressure sensitive device for continuous use in aircraft altimeter instrumentation and the like and comprising in combination: an elongated vessel having an upper end and a lower end; said vessel having an opening adjacent the upper end thereof in communication with external ambient pressure; a boilable liquid in said vessel at the lower end thereof having a higher boiling point than water; a heating element for heating said liquid at a predetermined rate to ensure vigorous boiling thereof at the ambient pressure being measured and during a change in said pressure; a condensing head on said vessel at the upper end thereof including means for dissipating heat therefrom at a rate substantially corresponding to the rate of heat input of said heating element; a temperature sensing element in said vessel adjacent said heating element but disposed thereabove; baffle structure defining within said vessel a condensing zone adjacent said head, a vapour reservoir thermally isolating said zone and said sensing element, a sensing zone about said temperature sensing element and a refluxing zone serving as a super heat barrier between said sensing zone and said heating element; and a supplementary condenser in the form of a metal rod within said vessel at the upper end thereof and located in said condensing zone.

3. An ambient pressure sensitive device for continuous use in aircraft altimeter instrumentation and the like and comprising in combination: an elongated vessel having an upper end and a lower end; said vessel having an opening adjacent the upper end thereof in communication with external ambient pressure; a boilable liquid in said vessel at the lower end thereof having a higher boiling point than water; a heating element for heating said liquid at a predetermined rate to ensure vigorous boiling thereof at the ambient pressure being measured and during a change in said pressure; a condensing head on said vessel at the upper end thereof including means for dissipating heat therefrom at a rate substantially corresponding to the rate of heat input of said heating element; a temperature sensing element in said vessel adjacent said heating element but disposed thereabove; baffle structure defining within said vessel a condensing zone adjacent said head, a vapour reservoir thermally isolating said zone and said sensing element, a sensing zone about said temperature sensing element and a refluxing zone serving as a super heat barrier between said sensing zone and said heating element; a supplementary condenser in the form of a metal rod within said vessel at the upper end thereof and located in said condensing zone; and an electrically conductive filament of negligible thermal conductivity communicating from said supplementary condenser rod downwardly within said vessel through said vapour reservoir to said temperature sensing element and serving as a condensate droplet communicating member from said supplementary condenser to said sensing element.

4. An ambient pressure sensitive device for continuous use in aircraft altimeter instrumentation and the like and comprising in combination: an elongated vessel having an upper end and a lower end; means adjacent the upper end of said vessel for communicating exterior ambient pressure to the interior thereof; baffle structure within said vessel effectively defining therewithin a liquid boiling zone at the lower end thereof, a vapour refluxing zone above said boiling zone, a temperature sensing zone above said refluxing zone, a vapour reservoir above said temperature sensing zone and a vapour condensing zone above said vapour reservoir at the upper end of said vessel in communication with said ambient pressure communicating means; a boilable liquid in said boiling zone having a higher boiling point than water; means for adding heat to said liquid at a rate maintaining boiling thereof at a rate of increase of ambient pressure corresponding to a rate of descent of an aircraft; a vapour condensing head on said vessel at the upper end thereof in communication with said condensing zone and including means for dissipating heat at a rate corresponding to the rate of heat input of said heating means to said liquid; and a temperature sensing element in said temperature sensing zone responsive to the boiling temperature of said liquid.

5. An ambient pressure sensitive device for continuous use in aircraft altimeter instrumentation and the like and comprising in combination: an elongated vessel having an upper end and a lower end; means adjacent the upper end of said vessel for communicating exterior ambient pressure to the interior thereof; baffle structure within said vessel effectively defining therewithin a liquid boiling zone at the lower end thereof, a vapour refluxing zone above said boiling zone, a temperature sensing zone above said refluxing zone, a vapour reservoir above said temperature sensing zone and a vapour condensing zone above said vapour reservoir at the upper end of said vessel in communication with said ambient pressure communicating means; a boilable liquid in said boiling zone having a higher boiling point than water; means for adding heat to said liquid at a rate maintaining boiling thereof at a rate of increase of ambient pressure corresponding to a rate of descent of an aircraft; a vapour condensing head on said vessel at the upper end thereof in communication with said condensing zone and including means for dissipating heat at a rate corresponding to the rate of heat input of said heating means to said liquid; a temperature sensing element in said temperature sensing zone responsive to the boiling temperature of said liquid, the said sensing element being in the form of a thermistor; and electrical leads in the form of rigid wires extending downwardly within said vessel from said head and supporting said heating element, said thermistor and said baffle structure therein.

6. An ambient pressure sensitive device for continuous use in aircraft altimeter instrumentation and the like and comprising in combination: an elongated vessel having an upper end and a lower end; means adjacent the upper end of said vessel for communicating exterior ambient pressure to the interior thereof; baffle structure within said vessel effectively defining therewithin a liquid boiling zone at the lower end thereof, a vapour refluxing zone above said boiling zone, a temperature sensing zone above said refluxing zone, a vapour reservoir above said temperature sensing zone and a vapour condensing zone above said vapour reservoir at the upper end of said vessel in communication with said ambient pressure communicating means; a boilable liquid in said boiling zone having a higher boiling point than water; means for adding heat to said liquid at a rate maintaining boiling thereof at a rate of increase of ambient pressure corresponding to a rate of descent of an aircraft; a vapour condensing head on said vessel at the upper end thereof in communication with said condensing zone and including means for dissipating heat at a rate corresponding to the rate of heat input of said heating means to said liquid; a temperature sensing element in said temperature sensing zone responsive to the boiling temperature of said liquid; and a supplementary condenser in the form of a vertical rod within said condensing zone.

7. An ambient pressure sensitive device for continuous use in aircraft altimeter instrumentation and the like and comprising in combination: and elongated vessel having an upper end and a lower end; means adjacent the upper end of said vessel for communicating exterior ambient pressure to the interior thereof; baffle structure within said vessel effectively defining therewithin a liquid boiling zone at the lower end thereof, a vapour refluxing zone above said boiling zone, a temperature sensing zone above said refluxing zone, a vapour reservoir above said temperature sensing zone and vapour condensing zone above said vapour reservoir at the upper end of said vessel is communication with said ambient pressure communicating means; a boilable liquid in said boiling zone having a higher boiling point than water; means for adding heat to said liquid at a rate maintaining boiling thereof at a rate of increase of ambient pressure corresponding to a rate of descent of an aircraft; a vapour condensing head on said vessel at the upper end thereof in communication with said condensing zone and including means for dissipating heat at a rate corresponding to the rate of heat input of said heating means to said liquid; a temperature sensing element in said temperature sensing zone responsive to the boiling temperature of said liquid; a supplementary condenser in the form of an axial rod in said condensing zone; and a condensate droplet communicating filament of negligible thermal conductivity extending downwardly from said supplementary condenser for communication of condensate droplets to said temperature sensing element.

8. An ambient pressure sensitive device for continuous use in aircraft altimeter instrumentation and the like and comprising in combination: an elongated thermally insulated vessel having an open end in communication with ambient pressure; a boiling liquid in said container consisting of a substantially pure chemical compound and being non-aqueous, non-electrolytic and substantially stable against decomposition and oxidation in air and having a boiling point temperature higher than that of water; an electrical heater immersed in said liquid for continuously boiling the latter; electrical temperature sensing means including a resistance sensitive to temperature disposed within said vessel in axially spaced relation from said relation from said heater and above the latter; baffle means disposed between said heater and said resistance within said vessel above the level of liquid in the latter serving effectively as a barrier against superheated vapours and liquid rising within said vessel toward said sensing means; vapour condensing means within said vessel adjacent the open end thereof; and a plurality of baffle means within said vessel between said condensing means and said sensing means defining therebetween a vapour reservoir effectively thermally isolating said condensing means and said temperature sensing means.

9. A sensing device for continuously sensing the altitude of an aircraft or the like and comprising in combination: a hollow casing having heat radiating surfaces adapted to dissipate a predetermined amount of heat per unit of time; an elongated vessel having an open end; means within said casing defining condensing surfaces adjacent the open end of said vessel; a bore in said casing communicating the open end of said vessel with exterior ambient pressure whereby the pressure within said vessel corresponds to said ambient pressure; means within said vessel adjacent the other end thereof for generating heat at a rate substantially equal to the rate of heat dissipation from said casing; a boilable liquid having a higher boiling temperature than water within said vessel present in an amount sufficient only to immerse said heat generating means therein; a supplementary condenser within said vessel adjacent the open end thereof in the form of a metal rod defining a condensing zone within said vessel; a temperature sensing element within said vessel between said rod and said boilable liquid; and a condensate communicating member of negligible thermal conductivity for communicating condensate from said rod to said temperature sensing element and defining a vapour reservoir region therebetween within said vessel.

10. An ambient pressure sensitive device for continuous use in aircraft altimeter instrumentation and the like and comprising in combination: an elongated vessel; an upper open end for said vessel in communication with external ambient pressure; a boilable liquid in said vessel; a heater immersed in said boilable liquid and defining a boiling zone in said vessel; baffle means within said vessel above said boiling zone adapted for the passage of liquid vapour upwardly therethrough and defining a refluxing zone; temperature sensing means within said vessel above said refluxing zone; a vapour reservoir within said vessel above said temperature sensing means; baffle structure defining within said vessel a condensing zone above said vapour reservoir and located in said vessel in communication with the open end of the latter; a vapour condenser having radiating means adapted to dissipate the entire heat of said heating element; a supplementary condenser in the form of an axially located rod within said condensing zone; and an electrical conductor of negligible thermal conductivity extending from said rod to said temperature sensing means through said vapour reservoir to effect wetting of said sensing means by condensate from said rod thereby heated to boiling point when passing through said vapour reservoir.

References Cited in the file of this patent

UNITED STATES PATENTS

| | | |
|---|---|---|
| 822,338 | Bennett | June 5, 1906 |
| 2,677,279 | Rich | May 4, 1954 |
| 2,713,795 | Herdon et al. | July 26, 1955 |

FOREIGN PATENTS

| | | |
|---|---|---|
| 519,083 | Great Britain | Mar. 15, 1940 |

OTHER REFERENCES

Review of Scientific Instruments, vol. 18, #11, page 851, November 1947.